United States Patent [19]
Nishikawa

[11] Patent Number: 5,552,693
[45] Date of Patent: Sep. 3, 1996

[54] CHARGING METHOD AND APPRATUS FOR CARRYING OUT THE SAME

[75] Inventor: Tsutomu Nishikawa, Kanagawa-ken, Japan

[73] Assignee: Canon Kabushiki Kaisha, Tokyo, Japan

[21] Appl. No.: 307,049

[22] Filed: Sep. 16, 1994

Related U.S. Application Data

[63] Continuation of Ser. No. 158,146, Nov. 19, 1993, abandoned, which is a continuation of Ser. No. 14,078, Feb. 4, 1993, abandoned, which is a continuation of Ser. No. 739,673, Aug. 2, 1991, abandoned.

[30] Foreign Application Priority Data

Sep. 13, 1990 [JP] Japan .................................. 2-245720

[51] Int. Cl.$^6$ ............................................................. H02J 7/04
[52] U.S. Cl. ........................................... 320/22; 320/23
[58] Field of Search .................................. 320/22, 23, 29, 320/39

[56] References Cited

U.S. PATENT DOCUMENTS

| | | | |
|---|---|---|---|
| 4,128,798 | 12/1978 | Takei | 320/23 |
| 4,418,310 | 11/1983 | Bollinger | 320/39 |
| 4,631,468 | 12/1986 | Satoh | 320/22 |
| 4,639,655 | 1/1987 | Westhaver et al. | 320/14 |
| 4,806,840 | 2/1989 | Alexander et al. | 320/20 |

FOREIGN PATENT DOCUMENTS 0103127  4/1989  Japan ........................................ 320/11

*Primary Examiner*—Peter S. Wong
*Assistant Examiner*—Adolf Berhane
*Attorney, Agent, or Firm*—Robin, Blecker, Daley & Driscoll

[57] ABSTRACT

In a charging method and apparatus according to the present invention, after a first charging operation is performed on a secondary battery, a second charging operation is performed subsequently to the first charging operation, whereby the secondary battery can be fully charged irrespective of the charge characteristic of the secondary battery.

9 Claims, 3 Drawing Sheets

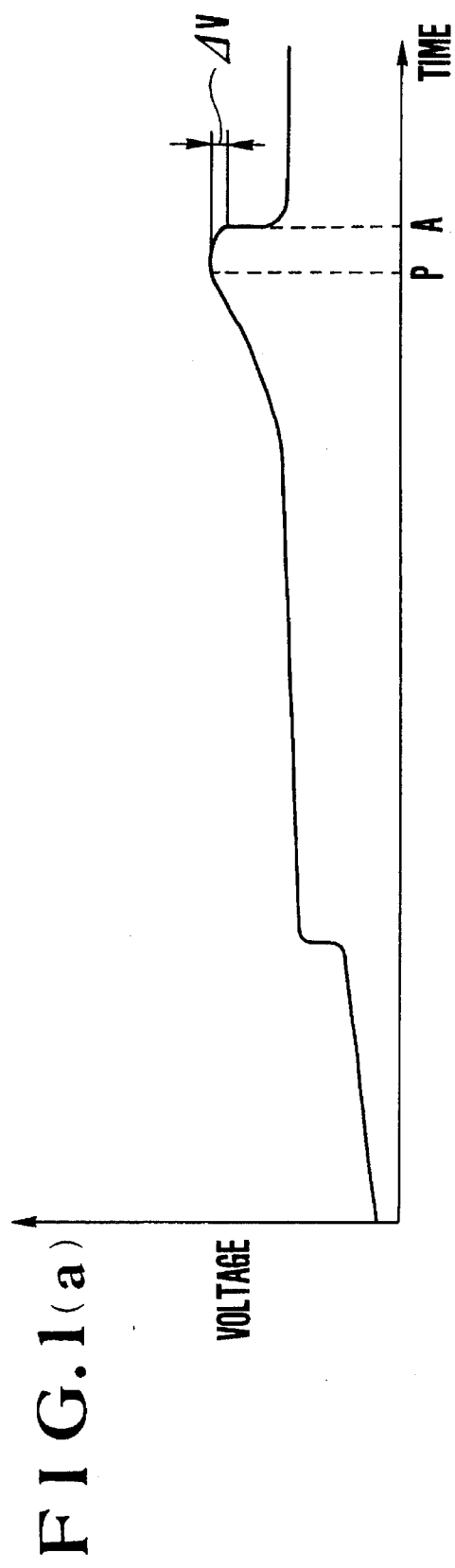
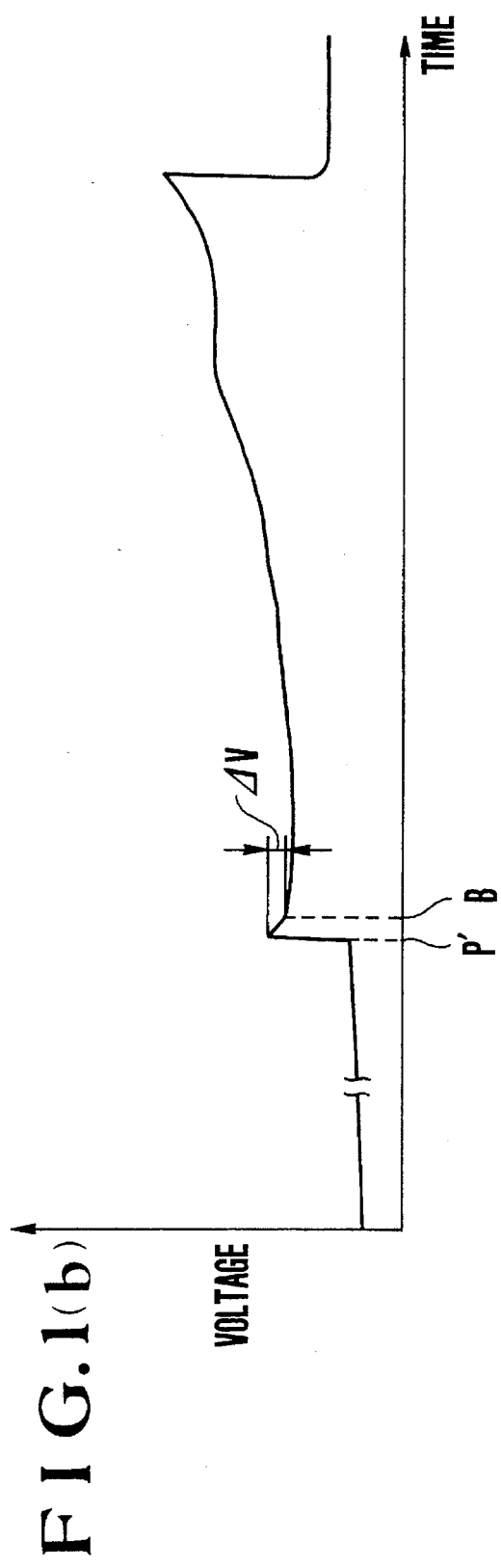
FIG.1(a)
FIG.1(b)

CHARGING METHOD AND APPRATUS FOR CARRYING OUT THE SAME

This is a continuation application under 37 CFR 1.62 of prior application Ser. No. 08/158,146, filed Nov. 19, 1993, now abandoned; which is a continuation of Ser. No. 08/014,078, filed Feb. 4, 1993 (now abandoned), which is a continuation of Ser. No. 07/739,673, filed Aug. 2, 1991 (now abandoned).

BACKGROUND OF THE INVENTION

1. Field of the Invention

The present invention relates to a charging method of performing charging of a secondary battery and to a charging apparatus for carrying out such a charging method.

2. Description of the Related Art

In general, a secondary battery has the following charge characteristic. As a charging current is supplied to a secondary battery, the voltage thereof gradually rises as shown in FIG. 1($a$) and then drops after it has reached a peak as shown at a point P in FIG. 1($a$). For this reason, in a conventional charging apparatus, the voltage of the secondary battery is monitored during charging, and if it is detected (at a point A in FIG. 1($a$)) that the voltage dropped by a predetermined value $\Delta V$ (negative delta voltage: $-\Delta V$) after it had reached the peak, it is determined that the secondary battery has been fully charged, and the charging operation is completed.

However, all secondary batteries do not exhibit the charge characteristic shown in FIG. 1($a$). For example, if secondary batteries remain not in use for a long period, some of them will exhibit a charge characteristic in which a voltage peak (P' of FIG. 1($b$)) appears within a short time after the supply of a charging current has been initiated, and the voltage further rises after it has dropped once. If a secondary battery having such a charge characteristic is to be charged by means of the conventional charging apparatus, the voltage of the secondary battery drops by $\Delta V$ at a point B in FIG. 1($b$), at which time it is determined that full charge has been achieved, and the charging operation is interrupted. As a result, the charging operation is brought to an end in spite of an insufficiently charged state.

SUMMARY OF THE INVENTION

It is, therefore, an object of the present invention to provide a charging method and apparatus which make it possible to solve the above-described problems.

Another object of the present invention is to provide a charging method capable of fully charging a secondary battery irrespective of the charge characteristic thereof.

To achieve the above objects, according to one aspect of the present invention, there is provided a method of charging a secondary battery, which comprises a first step of performing a first charging operation on the secondary battery and a second step of performing a second charging operation subsequently to the first charging operation after the first charging operation has been performed in the first step.

Another object of the present invention is to provide a charging apparatus capable of fully charging a secondary battery irrespective of the charge characteristic thereof.

To achieve the above object, according to another aspect of the present invention, there is provided an apparatus for charging a secondary battery, which comprises a first switch for controlling supply of a charging current to the secondary battery during the performance of a first charging operation on the secondary battery, a second switch for controlling supply of the charging current to the secondary battery during the performance of a second charging operation on the secondary battery, and controlling means for controlling the operation of the first switch and that of the second switch so that the second charging operation is performed by actuating the second switch after the first charging operation has been performed by actuating the first switch.

The above and other objects, features and advantages of the present invention will become apparent from the following detailed description of an embodiment of the present invention, taken in conjunction with the accompanying drawings.

BRIEF DESCRIPTION OF THE DRAWINGS

FIGS. 1($a$) and 1($b$) are charts showing the charge characteristics of different secondary batteries;

DETAILED DESCRIPTION OF THE PREFERRED EMBODIMENT

A preferred embodiment of the present invention will be described below with reference to the accompanying drawings.

Figure 2:
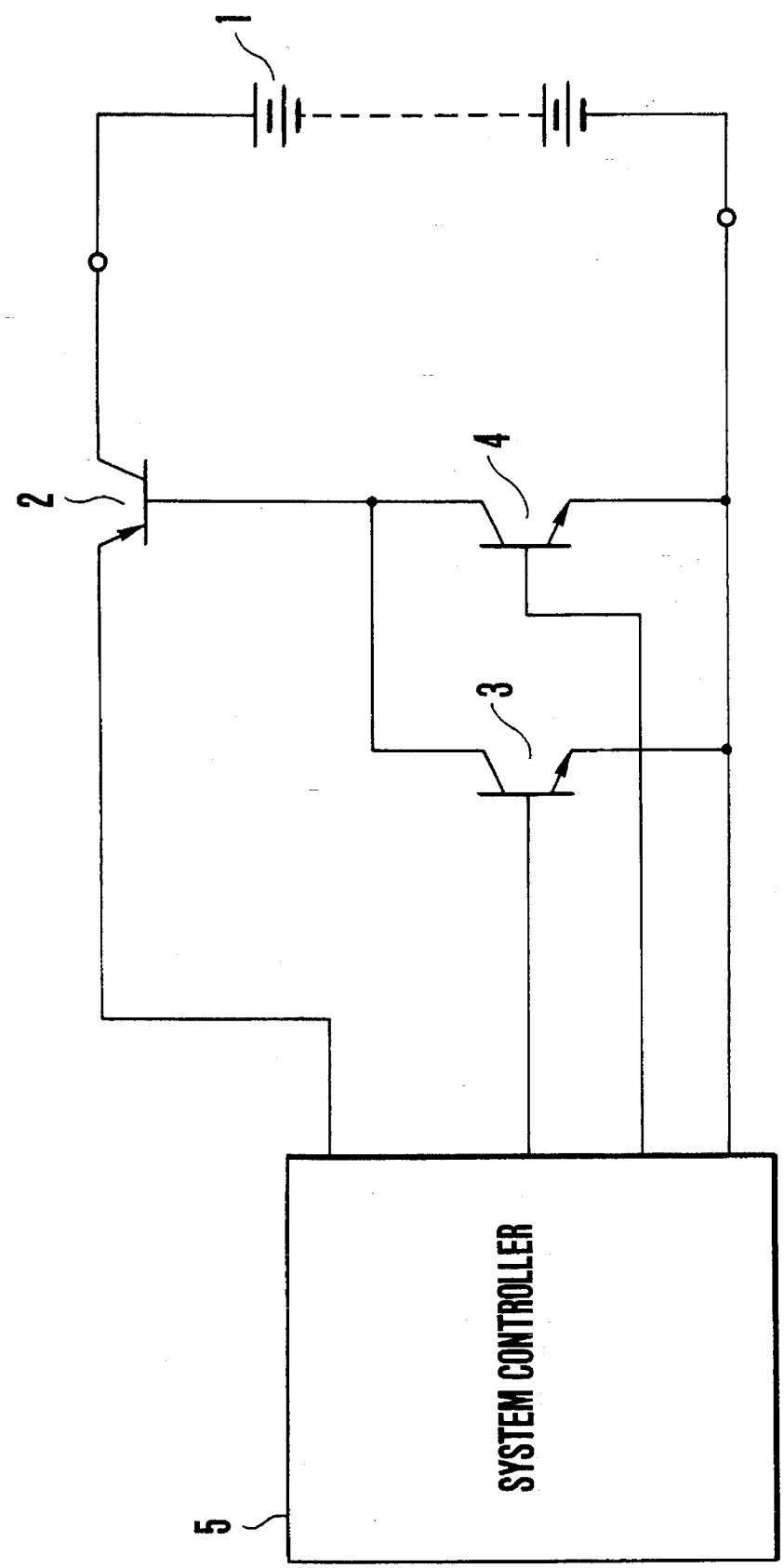
FIG. 2 is a block diagram schematically showing the arrangement of a charging apparatus according to one embodiment of the present invention.

FIG. 2 is a block diagram schematically showing the arrangement of a charging apparatus according to the embodiment of the present invention. The shown charging apparatus includes a secondary battery 1 to be charged by the present charging apparatus, a switch 2 for controlling supply of a charging current to the secondary battery 1, switches 3 and 4 for controlling the operation of the switch 2, and a system controller 5 for controlling the charging operation of the present charging apparatus by controlling the switches 3 and 4.

Figure 3:
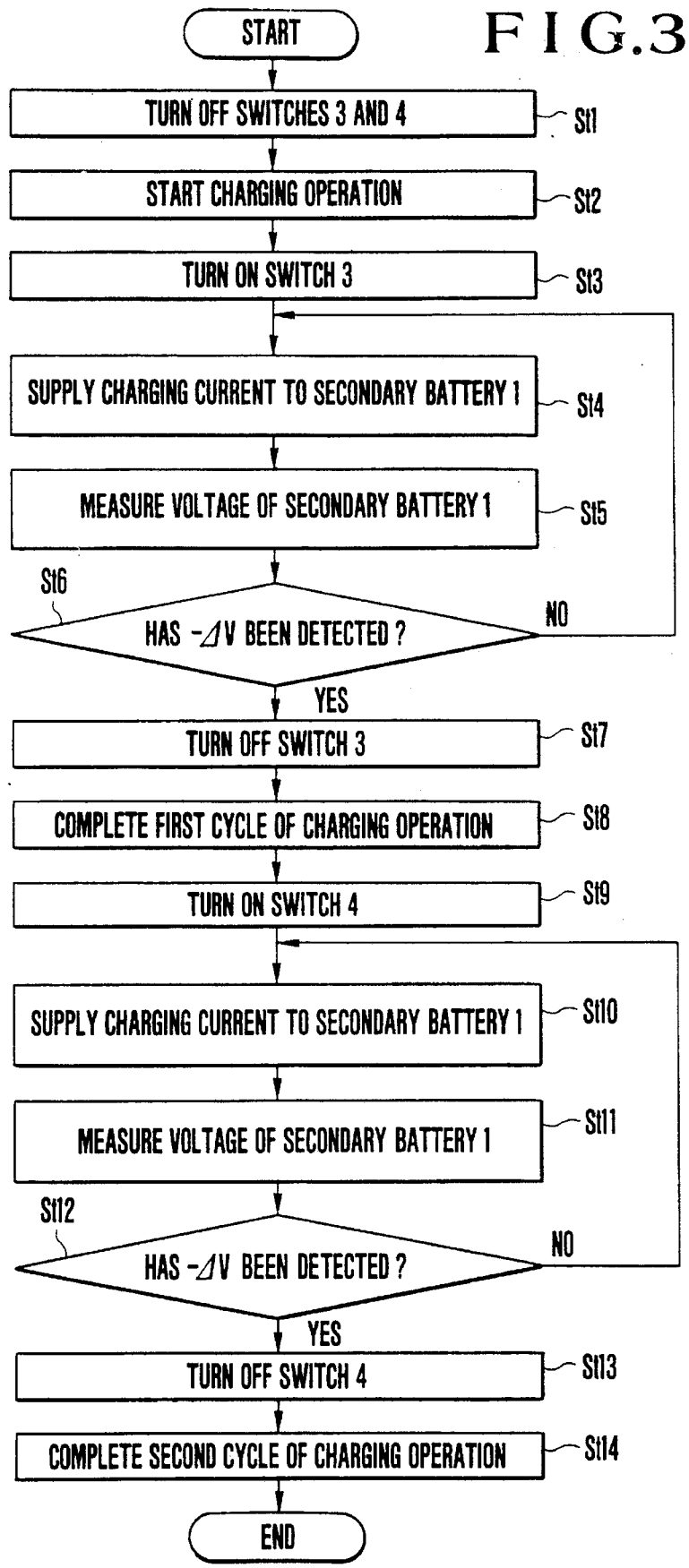
FIG. 3 is an operational flowchart used for explaining the operation of the system controller 5 of FIG. 2.

FIG. 3 is an operational flowchart used for explaining the operation of the system controller 5 of FIG. 2.

The operation of the apparatus shown in FIG. 2 will be explained below with reference to FIG. 3.

In the apparatus of FIG. 2, the system controller 5 initially turns off the switches 3 and 4 to turn off the switch 2, thereby stopping a charging current, which is being supplied to the switch 2 from a current source (not shown), from being supplied to the secondary battery 1 (Step St1 of FIG. 3).

Then, the secondary battery 1 is loaded into the apparatus and the system controller 5 is instructed to start a charging operation by the operation of a charging start switch (not shown). At this time, the system controller 5 turns on the switch 3 which is in the off state, thereby turning on the switch 2. The charging current which is being supplied to the switch 2 is supplied to the secondary battery 1, thereby starting a charging operation (Steps St2–St4 of FIG. 3).

During the charging operation which has been started in the above-described manner, the system controller 5 continues to measure the voltage (terminal voltage) of the secondary battery 1, and the charging operation and a detecting operation for detecting $-\Delta V$ are continued until the time when a value of displacement in the voltage of the secondary battery 1 reaches $-\Delta V$ (that is, until the time when the voltage drops by $\Delta V$). At the time when $\Delta V$ is detected, the system controller 5 turns off the switch 3, thereby turning off the switch 2. Thus, the supply of the charging current to the secondary battery 1 is interrupted and a first cycle of charging operation is completed (Steps St5–St8 of FIG. 3).

After the first cycle of charging operation has been completed in the above-described manner, the system controller 5 turns on the switch 4 which is in the off state, thereby turning on the switch 2. The charging current which is being supplied to the switch 2 is again supplied to the secondary battery 1, thereby initiating a second cycle of charging operation (Steps St9–St10 of FIG. 3).

During the second cycle of charging operation, the system controller 5 continues to measure the voltage (terminal voltage) of the secondary battery 1 in a manner similar to that performed during the aforesaid first cycle of charging operation. The second cycle of charging operation and a detecting operation for detecting $-\Delta V$ are continued until the time when $-\Delta V$ is detected. At the time when $-\Delta V$ is detected, the system controller 5 turns off the switch 4, thereby turning off the switch 2. Thus, the supply of the charging current to the secondary battery 1 is interrupted and the second cycle of charging operation is completed (Steps St11–St14 of FIG. 3).

As described above, in the charging apparatus shown in FIG. 2, two successive cycles of charging operations are performed; that is to say, after it has been detected that full charge has been achieved once, a charging operation is again performed and is brought to an end when it is detected that full charge has been achieved again. Accordingly, it is possible to charge the secondary battery reliably.

The present invention is not limited to the arrangement shown in FIG. 2. For example, the switches 3 and 4 of FIG. 2 may be replaced by the switch 3 only, and the switch 3 may be controlled to operate twice by the system controller 5.

The number of times of charging may be more than one. If the number of times of charging is to be increased, additional switches equivalent to the switches 3 and 4 of FIG. 2 may be connected in parallel with them. If only the switch 3 is used, the switch 2 may be controlled to operate more than once by the system controller 5. By increasing the number of times of charging in this manner, it is possible to improve the reliability of the charging operation of the secondary battery.

As is apparent from the foregoing description, according to the above-described embodiment, it is possible to provide a charging apparatus capable of fully charging a secondary battery irrespective of the charge characteristic thereof.

What is claimed is:

1. A charging method for charging a secondary battery comprising:

(A) a starting step of starting a charging operation on the secondary battery;

(B) a detecting step of detecting a terminal for detecting a terminal voltage of the secondary battery during the charging operation;

(C) a continuing step of continuing the charging operation on the secondary battery when it is detected in said detecting step that the terminal voltage of the secondary battery has dropped down by a predetermined amount; and (D) a terminating step of terminating the charging operation on the secondary battery when it is detected in said detecting step that the terminal voltage of the secondary battery has again dropped down by said predetermined amount.

2. A charging apparatus for charging a secondary battery, comprising:

(A) a power supply switch for controlling supply of a charging current to the secondary battery;

(B) a first control switch for controlling the supply of said charging current to the secondary battery by said power supply switch during the performance of a first charging operation on the secondary battery;

(C) a second control switch for controlling the supply of said charging current to the secondary battery by said power supply switch during the performance of a second charging operation on the secondary battery; and (D) control means for controlling an ON/OFF operation of the first control switch and second control switch in such a manner that the first charging operation is started by switching ON the first control switch, then the second charging operation is started by switching ON the second control switch.

3. An apparatus according to claim 2, wherein the control means is arranged to detect a terminal voltage of the secondary battery while the first charging operation being performed by turning ON the first control switch, to suspend the first charging operation by turning OFF the first control switch when the terminal voltage of the secondary battery has dropped down by a predetermined amount unusually and to start continuously the second charging operation by turning ON the second control switch.

4. An apparatus according to claim 2, wherein the control means is arranged to detect a terminal voltage of the secondary battery while the second charging operation is being performed by turning ON the second control switch and to terminate the second charging operation by turning OFF the second control switch thereby terminating all charging operation on the secondary battery when the terminal voltage of the secondary battery has dropped down more than twice by a predetermined amount.

5. A charging apparatus for charging a secondary battery, comprising:

(A) power supply switching means for controlling supply of a charging current to the secondary battery (B) control switching means for the supply of said charging current to the secondary battery by said power supply switching means during the performance of a charging operation on the secondary battery; and (C) control means for controlling the control switching means in such a manner that a first operation is performed by the supply of the charging current to the secondary battery by switching operation of the power supply switching means controlled by the control switching means, then a second charging operation is effected by continuing the supply of the charging current to the secondary battery by switching operation on the power supply switching means controlled by the control switching means and then all charging operation on the secondary battery is completed by terminating the second charging operation.

6. An apparatus according to claim 5, wherein said control switching means includes:

(a) a first control switch for controlling the supply of the charging current to the secondary battery by said power supply switching means during the first charging operation; and (b) a second control switch for controlling the supply of the charging current to the secondary battery by said power supply switching means during the second charging operation.

7. An apparatus according to claim 6, wherein the control means is arranged to detect a terminal voltage of the secondary battery during the performance of the first charging operation by turning ON the first control switch, to suspend the first charging operation when the terminal voltage of the secondary battery has dropped down by a predetermined amount unusually, by turning OFF the first control switch, and to start continuously the second charging operation by turning ON the second control switch.

8. An apparatus according to claim 6, wherein the control means is arranged to detect a terminal voltage of the secondary battery while the second charging operation being performed by turning ON the second control switch, and to terminate the second charging operation by turning OFF the second control switch, thereby terminating all charging operation on the secondary battery when the terminal voltage of the secondary battery has dropped down by a predetermined amount.

9. A charging apparatus for charging a secondary battery, comprising:

(A) power supply switching means for controlling supply of a charging current to the secondary battery;

(B) control switching means for controlling the supply of said charging current by said power switching means during the performance of charging the secondary battery; and (C) control means for controlling the control switching means in such a manner that variations in a terminal voltage of the secondary battery are monitored during the performance of the charging operation by actuating the control switching means and the supply of the charging current to the secondary battery by the power supply switching means is stopped thereby terminating all charging operation on the secondary battery when the terminal voltage of the secondary battery has dropped more than twice by a predetermined amount.

* * * * *

UNITED STATES PATENT AND TRADEMARK OFFICE
CERTIFICATE OF CORRECTION

PATENT NO. :   5,552,693

DATED       :   September 3, 1996

INVENTOR(S):   Tsutomu Nishikawa

It is certified that error appears in the above-identified patent and that said Letters Patent is hereby corrected as shown below:

Col. 4, line 41, after "for" insert -- controlling --.

Col. 5, line 12, after "operation" insert -- is --.

Signed and Sealed this

Twenty-ninth Day of April, 1997

Attest:

Attesting Officer

BRUCE LEHMAN

Commissioner of Patents and Trademarks